US006959144B2

(12) United States Patent
Shimonoma et al.

(10) Patent No.: US 6,959,144 B2
(45) Date of Patent: Oct. 25, 2005

(54) AIR HEATER WITH EXPANSION CONTAINING ELECTRIC HEATER ARRANGED IN STAGES

(75) Inventors: Yukihiko Shimonoma, Aichi-ken (JP); Keiichi Ito, Aichi-ken (JP); Yoshinori Fujisawa, Aichi-ken (JP); Yoshimune Yamada, Aichi-ken (JP)

(73) Assignee: Rinnai Corporation, Aichi-ken (JP)

( * ) Notice: Subject to any disclaimer, the term of this patent is extended or adjusted under 35 U.S.C. 154(b) by 0 days.

(21) Appl. No.: 10/720,274

(22) Filed: Nov. 25, 2003

(65) Prior Publication Data

US 2004/0103892 A1    Jun. 3, 2004

(30) Foreign Application Priority Data

Nov. 29, 2002 (JP) ............................. 2002-347021

(51) Int. Cl.[7] ............................................. F24D 13/00
(52) U.S. Cl. ..................................... 392/307; 392/365
(58) Field of Search ..................... 392/307, 360–369, 392/379–385, 350, 485, 488–489

(56) References Cited

U.S. PATENT DOCUMENTS

| 1,232,598 | A | * | 7/1917 | Norstrom et al. | 392/360 |
|---|---|---|---|---|---|
| 1,527,292 | A | * | 2/1925 | Barlow | 392/307 |
| 1,821,297 | A | * | 9/1931 | Driscoll | 165/60 |
| 2,051,441 | A | * | 8/1936 | Ellis | 261/124 |
| 2,257,342 | A | * | 9/1941 | Lintern | 392/368 |
| 2,278,180 | A | * | 3/1942 | Lewis | 392/380 |
| 2,597,215 | A | * | 5/1952 | Wright et al. | 392/488 |
| 2,683,796 | A | * | 7/1954 | Koff | 392/356 |
| 2,790,064 | A | * | 4/1957 | Stuart | 392/365 |
| 3,095,497 | A | * | 6/1963 | Thomas | 392/360 |
| 6,795,643 | B2 | * | 9/2004 | Ito et al. | 392/307 |
| 6,882,796 | B2 | * | 4/2005 | Ito et al. | 392/307 |
| 2004/0109680 | A1 | * | 6/2004 | Ito et al. | 392/307 |
| 2004/0151480 | A1 | * | 8/2004 | Ito et al. | 392/307 |

* cited by examiner

Primary Examiner—John A. Jeffery
(74) Attorney, Agent, or Firm—Arent Fox PLLC

(57) ABSTRACT

Providing a hot air heater and an expansion in the air blowing passage of the hot air heater and suppressing increases in air trunk resistance even if electric heaters are arranged in this expansion in a plurality of stages prevents increases in the rotation speed of the air blowing fan in order to obtain a target air flow which in turn causes the operating noise to grow louder. Therefore, an expansion 35 was formed along the air blowing passage 32. This expansion 35 has an entrance opening 351 and an exit opening 352 and functions as a storage portion that contains the electric heaters 34. The electric heaters are arranged in a plurality of stages in such a manner as to face said entrance opening and a distance between the entrance opening in the expansion and one of the electric heaters that has a highest wind speed at the entrance opening in the expansion of distances between the entrance opening in the expansion and the respective electric heaters is set farther.

2 Claims, 2 Drawing Sheets

AIR HEATER WITH EXPANSION CONTAINING ELECTRIC HEATER ARRANGED IN STAGES

BACKGROUND OF THE INVENTION

1. Field of the Invention

The present invention relates to a hot-air heater which incorporates an air-blowing fan on an upstream side and an electric heater on a downstream side of an air-blowing passage.

2. Description of the Related Art

A conventional hot-air heater has, as described in Jpn. Pat. Appln. KOKAI Publication No. 1998-132385, comprises a frame having an outlet and an inlet formed therein, in which frame an air-blowing passage is formed which leads from the inlet to the outlet. Along this air-blowing passage, there are provided an air-blowing fan on an upstream side and an electric heater constituted of an elongated sheathed heater etc. on an downstream side. In this case, the electric heater is disposed in such a manner as to intersect with air flowing along the air-blowing passage. In this configuration, if the air-blowing fan is operated, air is sucked in the air-blowing passage through the inlet and heated by the electric heater to provide hot air having a predetermined temperature, which is blasted out of the outlet to a room.

In this hot-air heater, an air trunk area of the air-blowing passage is kept constant all along this passage leading from the downstream side of the air-blowing fan to the outlet and the electric heater is provided somewhere along this passage, so that air trunk resistance in this air-blowing passage (i.e., resistance against air flow in the air-blowing passage) is increased by this electric heater, which is a problem. Therefore, it has been proposed to form an expansion on the air-blowing passage so that the expansion may be a storage portion to contain the electric heater. In this case, the electric heater evenly heats air passing through this expansion, so that it may be considered to arrange the electric heaters in a plurality of stages in such a manner that the heater may face an entrance opening in the expansion.

If, as in the case of this hot-air heater, a bent portion is formed along the air-blowing passage and provided with the air-blowing fan, a wind speed of air flowing on an outer side of the bent portion is higher than that of air flowing on an inner side of this bent portion, so that a wind speed distribution in the air-blowing passage between the bent portion and the electric heater does not become constant. Therefore, if the electric heaters are arranged in a plurality of stages along the entrance opening in the expansion, a large quantity of air locally collides with the electric heater positioned on the outer side of the bent portion where the wind speed is high, thus increasing air trunk resistance of the air-blowing passage. In this case, to obtain a sufficient airflow of hot air blasted out of the outlet, it is necessary to increase a rotation speed of a moving vane, thus increasing an operating sound, which is a problem.

In view of the above, it is an object of the present invention to provide a hot-air heater in which an expansion is provided along an air-blowing passage in such a manner that even if electric heaters are arranged on this expansion in a plurality of stages, air trunk resistance may be suppressed from increasing to prevent a rotation speed of an air-blowing fan from increasing for a purpose of obtaining a target airflow, thereby preventing operating sound from increasing.

SUMMARY OF THE INVENTION

To solve the above problems, a hot-air heater according to the present invention comprises:
an air-blowing passage leading from an inlet to an outlet;
an air-blowing fan and an electric heater which are provided along the air-blowing passage, so that when the air-blowing fan is operated to suck air in the air-blowing passage through the inlet, the air is heated by the electric heater to provide hot air, which is blasted out of the outlet to a room, wherein:
an expansion having an entrance opening and an exit opening is formed along the air-blowing passage as a storage portion to contain the electric heater;
the electric heaters are arranged in a plurality of stages in such a manner as to face the entrance opening; and
a distance between the entrance opening in the expansion and one of the electric heaters that has a highest wind speed at the entrance opening in the expansion of distances between the entrance opening in the expansion and the respective electric heaters is set larger According to the present invention, when the air-blowing fan is driven, air in a room is sucked in the air-blowing passage and flows to the expansion. When the air reaches the expansion, a flow of the air is diverged to decrease the wind speed. If, in this case, a wind speed distribution at the entrance opening in the expansion is not constant and, therefore, any one of the electric heaters that has the highest wind speed at the entrance opening in the expansion is kept distant from the entrance opening beforehand, wind speeds at time when the air collides with the electric heaters can be made nearly equal at positions of the electric heaters. Accordingly, it is possible to prevent a large quantity of air from locally colliding with any particular one of the electric heaters, thereby avoiding an increase in air trunk resistance of the air-blowing passage.

In the present invention, to decrease a height of an appliance itself, preferably a bent portion is formed on the air-blowing passage by bending it somewhere along it and mounted with a moving vane that constitutes the air-blowing fan. In this case, the wind speed increases toward an outer side of the bent portion, so that the distance from the entrance opening in the expansion to the electric heaters should preferably be increased toward the outer side of the bent portion.

DETAILED DESCRIPTION OF A PREFERRED EMBODIMENT

Figure 1:
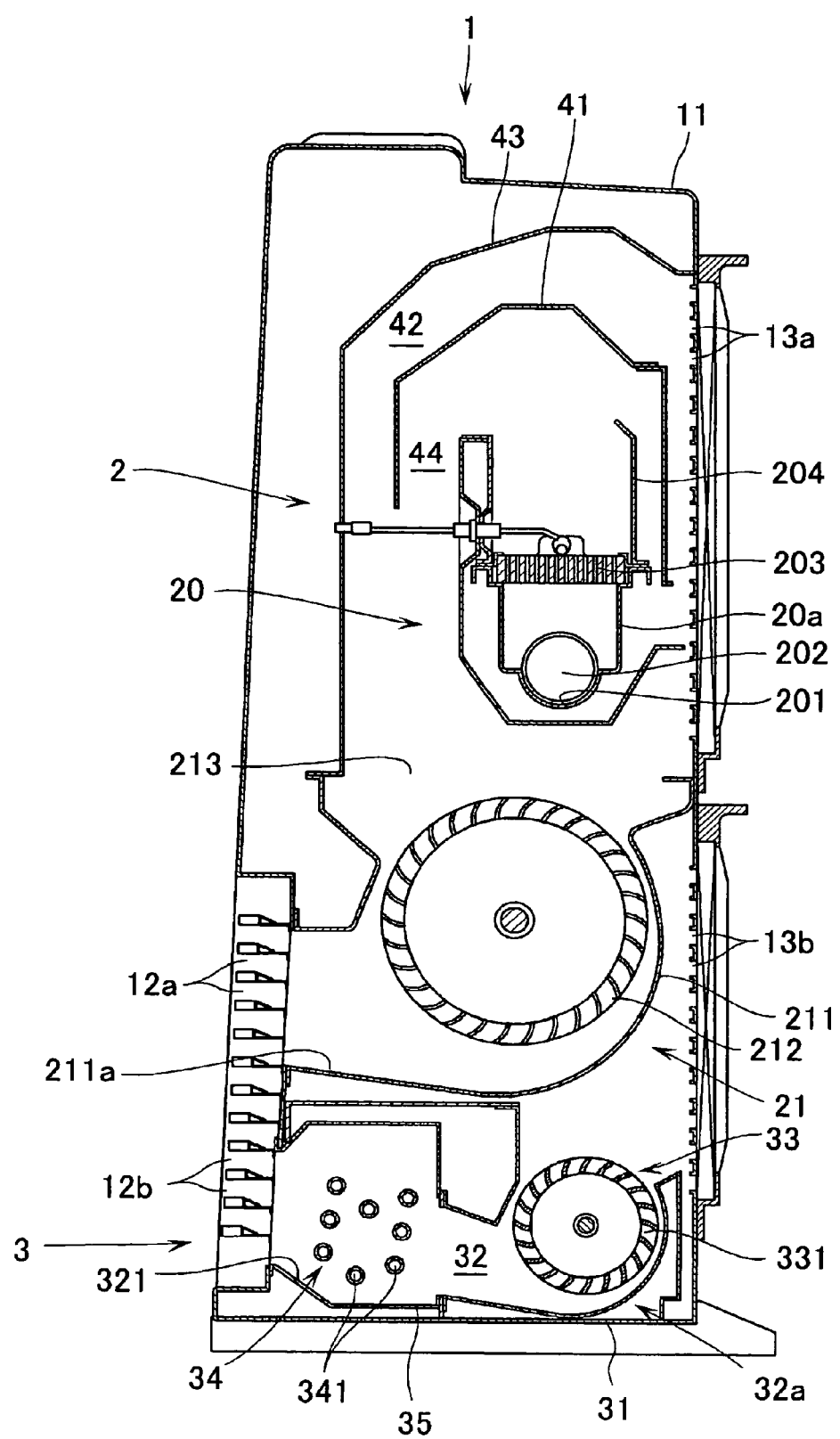
FIG. 1 is an explanatory cross-sectional view of a configuration of an electric hot-air heater according to the present invention.
Figure 2:
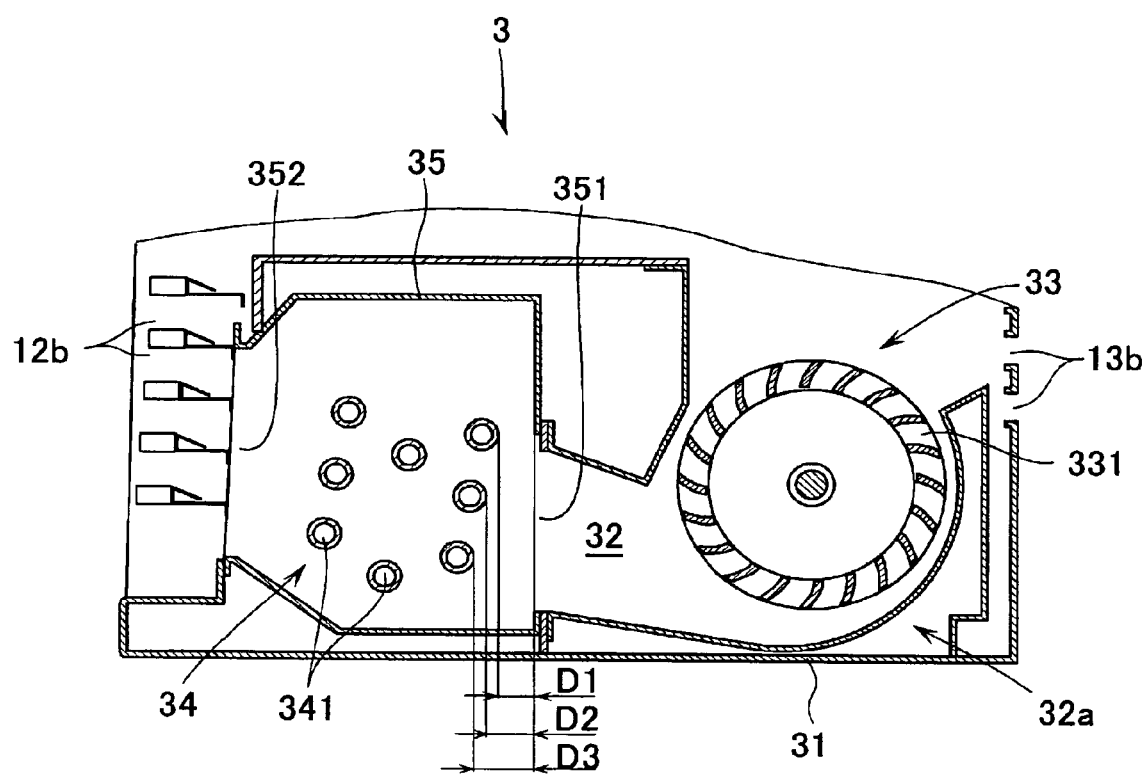
FIG. 2 is an explanatory expanded view of an electric heater portion.

In FIGS. 1 and 2, a reference numeral 1 indicates a hybrid type hot-air heater according to the present invention. This hot-air heater 1 has a box-shaped frame 11. In the frame 11, there are incorporated a gas heater portion 2 on an upper side and an electric heater portion 3 on a lower side. A first outlet 12a and a second outlet 12b are formed in a front face of the frame 11 and a first inlet 13a and a second inlet 13b are formed in a rear face of the frame 11 to face the gas heater portion 2 and the electric heater 3 respectively so that as described above two air-blowing fans are used to make an air-blowing system of the gas heater portion 2 and that of the electric heater portion 3 independent of each other.

The gas heater portion 2 is constituted of a gas burner 20 and a first air-blowing fan 21 which is arranged below the gas burner 20 and which supplies the gas burner 20 with combustion air and mixes combustion gas with air sucked through the first inlet 13a in the frame 11 to blast them out to a room. The gas burner 20 has a burner body 20a in which there are formed a fuel/air inlet 201 faced by a gas spray nozzle (not shown) mounted to a tip of a gas tube connected to a proportional valve (not shown) arranged in the frame 11 and a mixer tube portion 202 communicating with this inlet 201. On an open upper face of the burner body 20a, a ceramic flame-port plate 203 having a plurality of flame ports provided thereon in a row is mounted via a distribution plate (not shown), so that the gas burner 20 is contained in a combustion chamber 204.

In the frame 11, there is provided a diversion plate 41 in such a manner as to surround an upper side of the combustion chamber 204 and so that when the first air-blowing fan 21 is operated, air sucked through the first inlet 13a in the frame 11 and combustion gas discharged from the combustion chamber 204 may be partitioned from each other until they flow by a predetermined distance. Further, in the frame 11, there is provided a partition 43 in such a manner as to cover the combustion chamber 204 including the diversion plate 41 and so that an air passage 42 may be formed to lead to the first air-blowing fan 21 between itself and the diversion plate 41. The air-blowing fan 21 positioned below the burner body 20a has a housing 211 in which a air-blowing duct 211a leading to the first outlet 12a is formed.

In the housing 211, there is arranged a cross-flow type first moving vane 212 connected to a first motor (not shown) whose rotation speed can be controlled. In this case, the air passage 42 and an internal space of the housing 211 communicate with each other through an upper-face opening 213 in the housing 211. In such a manner, an air-blowing system of the gas heater portion 2 leading from the first inlet 13a to the first outlet 12a is formed. In this configuration, when the first motor is driven to rotate the first moving vane 212, air in the room is sucked through the inlet 13a in the frame 11, so that the air is supplied to the inlet 201 in the burner body 20a and flows through the air passage 42.

In this case, if fuel gas is sprayed through a gas spray nozzle (not shown) to the inlet 201, an air-fuel mixture of the air and the fuel gas is supplied to the flame port plate 203 and burns. It is to be noted that an air/fuel ratio is adjusted by controlling the first motor, to control a rotation speed of the first moving vane 212. Combustion gas generated from the gas burner 20 as a result of burning of the air-fuel mixture passes through a combustion gas passage 44 on an inner side of the diversion plate 41 and is sucked toward the first air-blowing fan 21. When having arrived at a downstream end of the diversion plate 41, the combustion gas and the air are mixed to be cooled and flow through the opening 213 in the housing 211. Then, the air-fuel mixture having a predetermined temperature is released through the first outlet 12a to the room.

On the other hand, the electric heater portion 3 is contained in a case 31 made of resin and has an air-blowing passage 32 leading from the second inlet 13b to the second outlet 12b. In this case, to miniaturize the electric heater portion 3, the air-blowing passage 32 is formed as bent in a direction from an upper side of the appliance 1 roughly to a horizontal side. A bent portion 32a obtained by thus bending this air-blowing passage 32 is provided with a second air-blowing fan 33. The second air-blowing fan 33 is constituted of a second motor (not shown) whose rotation speed can be controlled and a roughly cylindrical cross-flow type second moving vane 331 connected to this second motor and arranged on the bent portion 32a. On a downstream side of this bent portion 32a, there is provided an electrical heater 34 such as a sheathed heater. It is to be noted that it does not matter whether the rotation speed of the second motor can be controlled or not.

In such a manner, an air-blowing system of the electrical heater portion 3 is formed so as to lead from the second inlet 13b to the second outlet 12b. Then, if the second air-blowing fan 33 is operated, air is sucked through the second inlet 13b in the air-blowing passage 32 and heated by the electrical heater 34 to provide hot air, which is blasted out of the second outlet 12b in the room. The hot air, when blasted out of this second outlet 12b, may possibly overheat a floor of the room. Therefore, a lower face 321 of the air-blowing passage 32 leading from the second air-blowing fan 33 to the second outlet 12b is formed as inclined upward.

In this configuration, if an air trunk area of the air-blowing passage 32 is kept constant all along this passage leading from the downstream side of the air-blowing fan 33 to the second outlet 12b and the electric heater 34 is mounted somewhere along this passage, the electric heater 34 itself provides air trunk resistance in this air-blowing passage 32. Therefore, to a downstream end of the air-blowing passage 32, a metal-made expansion 35 in which an entrance opening 351 and an exit opening 352 leading to the second outlet 12b are formed is linked to provide the storage portion that contains the electric heater 34. In this case, the air trunk area is increased vertically as against an airflow direction so that air trunk resistance in the expansion 35 may be roughly the same as that of the air-blowing passage 32 on both sides of the expansion 35.

In this case, to evenly heats air passing through this expansion 35 by using the electric heater 34, the electrical heaters 34 are arranged to face the entrance opening 351 in the expansion 35 in such a configuration that a combination of elongated sheathed heaters 341 which are arranged in three vertical stages with a predetermined spacing therebetween in such a manner as to intersect with the air-blowing passage 32 is aligned as many as three rows in an airflow direction so that the sheathed heaters 341 may alternate with each other. Each sheathed heater 341 is supported by the frame 11 via a holder (not shown).

If, in this configuration, the bent portion 32a is formed along the air-blowing passage 32 and provided with the moving vane 331, a wind speed of air flowing on an outer side of the bent portion 32a is higher than that of air flowing on an inner side of this bent portion 32a, so that a wind speed distribution in the air-blowing passage 32 between the bent portion 32a and the electric heater 34 does not become constant. Therefore, if each row of the sheathed heaters 341 are arranged along the entrance opening 351 in the expansion 35, a large quantity of air locally collides with the sheathed heater 341 positioned on the outer side of the bent portion 32a where the wind speed is high, thus increasing air trunk resistance of the air-blowing passage 32. In this case, to obtain a sufficient airflow of hot air blasted out of the outlet 12b, it is necessary to increase a rotation speed of the moving vane 331, thus increasing an operating sound, which is a problem.

According to the present embodiment, distances D1, D2, and D3 between the entrance opening 351 and the respective sheathed heaters 341 are set to become longer toward the outer side of the bent portion 32a where the wind speed at this entrance opening 351 becomes high (see FIG. 2). In this case, because the distances D1, D2, and D3 between the entrance opening 351 and the respective sheathed heaters 341 are made different from each other and also because air, when having reached the expansion 35, is diverged in flow and decreased in wind speed, wind speeds at time when the air collides with the electric heaters 341 are made uniform by these sheathed heaters 341. Accordingly, it is possible to prevent a large quantity of air from locally colliding with any particular one of the sheathed heaters 341, thus avoiding an increase in air trunk resistance of the air-blowing passage 32.

Although in the present embodiment the moving vane 331 of the air-blowing fan 33 has been arranged on the bent portion 32a of the air-blowing passage 32, the present invention is not limited to it; for example, the moving vane 31 may be arranged on the upstream side of the bent portion 32a.

What is claimed is:

1. A hot-air heater comprising:
an air-blowing passage leading from an inlet to an outlet;
an air-blowing fan and an electric heater provided along said air-blowing passage so that when said air-blowing fan is operated to suck air in said air-blowing passage through said inlet, said air is heated by said electric heater to provide hot air which is blasted out of said outlet to a room wherein:
an expansion having an entrance opening and an exit opening is formed along said air-blowing passage as a storage portion to contain said electric heater; said electric heaters are arranged in a plurality of stages in such a manner as to face said entrance opening; and
a distance between said entrance opening in said expansion and one of said electric heaters that has a highest wind speed at said entrance opening in said expansion of distances between said entrance opening in said expansion and said respective electric heaters is set larger.

2. Said hot-air heater according to claim 1, wherein: a bent portion is formed on said air-blowing passage and mounted with a moving vane that constitutes said air-blowing fan; and said distances are set to become larger toward an outer side of said bent portion.

* * * * *